Sept. 14, 1926.

J. H. GILLOOLY 1,599,410

FURNACE CONTROL

Filed July 28, 1924    2 Sheets-Sheet 1

Patented Sept. 14, 1926.

1,599,410

UNITED STATES PATENT OFFICE.

JOHN H. GILLOOLY, OF SEWICKLEY, PENNSYLVANIA.

FURNACE CONTROL.

Application filed July 28, 1924. Serial No. 728,589.

This invention relates broadly to furnace control and particularly to a control in accordance with the composition of the flue gas from the furnace. Various methods have been proposed for controlling a furnace in accordance with flue gas composition but most of these have depended upon an analysis of the flue gas by apparatus operating much on the order of an Orsat apparatus. Various other forms have been proposed but most of them are open to various objections which are well known to operating engineers.

I provide for controlling furnace combustion by causing combustion of any unconsumed element of combustion remaining in the flue gas from the furnace and utilizing the resulting increased temperature of the flue gas to control the supply of an element of combustion to the furnace. I preferably supply flue gas at a measured rate to a plurality of chambers wherein the flue gas is heated. In certain of these chambers, conditions are favorable for the combustion of an unconsumed element of combustion remaining in the flue gas, and in another conditions are not favorable for such combustion. The flue gases are of different temperatures as they leave these chambers because of the increased heat in one of them due to the burning therein of the combustion element remaining in the flue gas. This increased temperature may be taken advantage of in various ways to cause a control but I preferably employ a thermostat above each of the chambers and operate controlling mechanism in accordance with the different effects of the flue gas upon the different thermostats.

The use of three chambers has been found exceedingly desirable. The first of these chambers is provided for heating flue gas but without causing combustion therein, for a purpose which will be hereinafter explained. The second chamber is adapted to normally supply heat to the flue gas in the same ratio as the first chamber but conditions are favorable for the combustion therein of any unconsumed fuel such as carbon-monoxide or hydrogen remaining in the flue gas. The third chamber is provided for the combustion of excess air. This combustion is caused by permitting the flue gas in its passage to the third chamber to pick up a fuel such as alcohol, which under the conditions set up in the third chamber, will burn and thus raise the temperature of the gas therein. By placing thermostats in cooperative relation to these three chambers and suitably combining the effects thereof a very effective combustion control may be secured.

Figure 1:
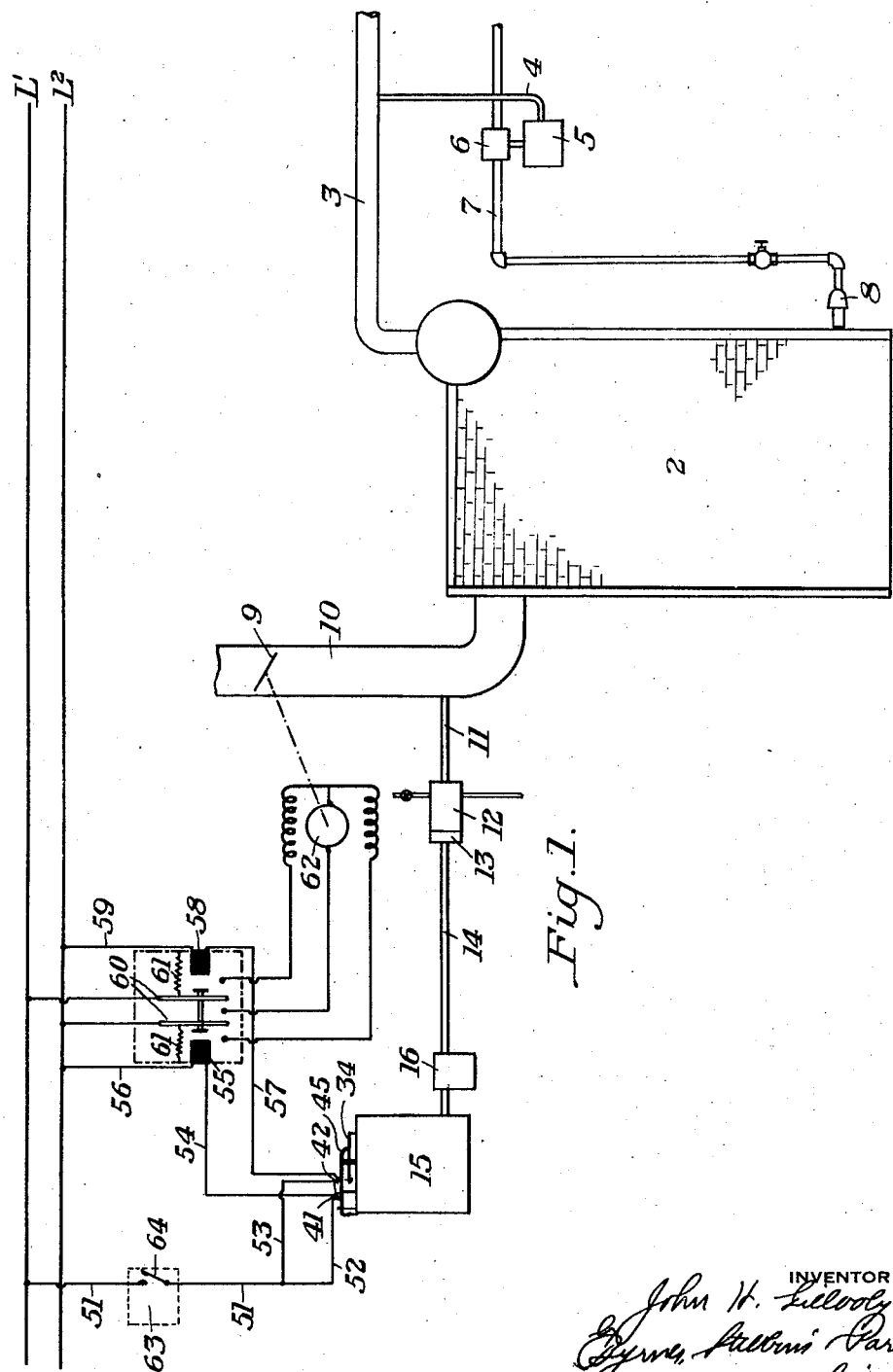
Figure 2:
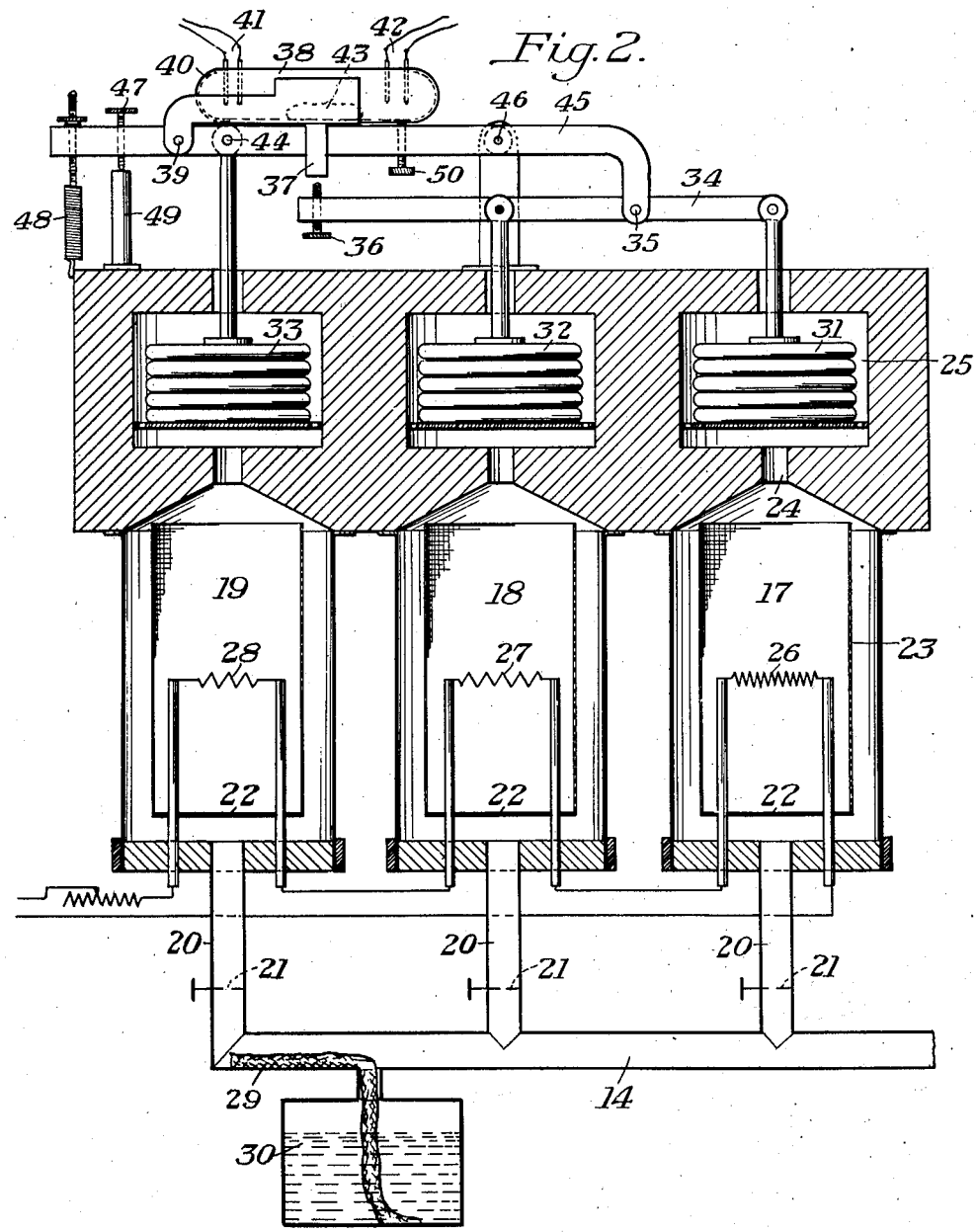

In the accompanying drawings which illustrate the present preferred embodiment of my invention, Figure 1 is a diagrammatic view of a furnace and its connections showing the manner in which I preferably regulate its operation, and Figure 2 is a vertical section, more or less diagrammatic, through the control apparatus proper.

In the illustrated embodiment of the invention, there is shown a furnace 2 which, for purposes of illustration, is shown as a boiler furnace. It will be understood, however, that the control is applicable to any type of furnace and that any desired fuel may be employed. The furnace is shown as supplying a steam header 3 from which a control line 4 is tapped off, which line terminates in a pressure regulator 5. The regulator is connected to a valve 6 in a conduit 7 supplying fuel to the burner 8 of the furnace. By this apparatus, the amount of fuel supplied to the furnace will vary in accordance with the demand.

The control of the air is effected by a damper 9 in the stack 10 of the furnace. A conduit 11 leads from the stack, and flue gas is drawn therethrough by means of a water aspirator 12. The gas is preferably passed through a filter 13, after which it travels through a conduit 14 leading to the control apparatus 15. Preferably, the aspirator is set to draw gas from the flue in considerably greater quantities than will be required by the control apparatus 15, since so doing insures a more accurate control. I, therefore, provide a relief valve 16 in the conduit 14 for liberating the excess flue gas supplied by the aspirator 12.

The control apparatus is shown in detail in Figure 2. It will be seen that the apparatus comprises three chambers 17, 18 and 19 connected to the conduit 14 by conduits 20 having adjustable orifices 21 therein. The purpose of these orifices is to supply flue gas to each of the chambers in measured quantities, and an adjustment of the orifices is provided so that a regulation of the apparatus may be effected. As the flue gas reaches any one of the chambers through the conduit 20, it strikes a baffle 22 and is spread out so that it passes upwardly over a radiation screen 23 which may be either solid or reticulated, thence through an opening 24 leading to a thermostat chamber 25. The radiation screens 23 are desirable not only for the reason that they prevent loss of heat from the elements by direct radiation, but also for the reason that they effectively break and distribute entering gases, thereby preventing undesirable eddy currents and insuring combustion if combustion supporting ingredients are present.

In the chambers 17, 18 and 19, there are provided electrical heating elements 26, 27 and 28, preferably of platinum. These elements are shown connected in series although they may, if desired, be connected in parallel. Normally, the same amount of heat should be supplied per unit quantity of gas in each of the three chambers. This is preferably accomplished by so forming the elements 26, 27 and 28 that each has substantially the same electrical resistance, so that they normally radiate heat at equal rates, and by supplying gas at substantially the same rate to each of the chambers. However, the heating element 26 is formed to have a greater total surface than the element 27, and the latter has a greater surface than the element 28. The temperatures of the three elements will, therefore, be different although they are supplying equal quantities of heat to the flue gas passing through the various chambers. The surfaces of the three elements are preferably so proportioned that the element 26 can be maintained at about 600° F., the element 27 at about 800° F. and the element 28 at about 1200° F.

Since the heating elements normally supply equal quantities of heat, the flue gas passing through the various chambers will be heated in equal amounts unless combustion of an element of combustion remaining in the flue gas occurs in one or more of the chambers. The grid temperature of 600° F. is maintained in the chamber 17 because at this temperature the gas will be heated therein but no combustion of any fuel or air remaining in the flue gas will occur. In the chamber 18, the grid temperature of 800° F. is sufficient to cause combustion of any carbon-monoxide or hydrogen remaining in the flue gas, and there will generally be found sufficient free oxygen in the flue gas to provide the other element of combustion necessary.

It will be noted that a wick 29 is placed in the conduit 14 over which any flue gas passing through the chamber 19 must pass. This wick dips into a container 30 filled with alcohol or other suitable fuel, so that as the flue gas passes into the chamber 19, it takes up a certain amount of fuel in vaporized form. The temperature of 1200° F. on the heating grid 28 is sufficient to cause combustion of the alcohol with the excess air in the flue gas so that the temperature of the flue gas as it issues from the chamber 19 is raised above the temperature of the gas issuing from the chamber 17 in an amount corresponding to the excess air in the flue gas. In a like manner, the increase of temperature of the flue gas issuing from the chamber 18 over the temperature of the gas issuing from the chamber 17 is a measure of the quantity of unconsumed fuel from the furnace going up the stack.

In the chambers 25 above the chambers 17, 18 and 19, I provide thermostats 31, 32 and 33, respectively. The thermostats 31 and 32 are pivotally connected to a lever 34 at equal distances from its fulcrum 35. If no combustion takes place in the chamber 18, the effect of the thermostats 31 and 32 on the lever 34 is the same and no movement of the lever takes place. If, however, combustion does take place in the chamber 18 the temperature of the gas passing therethrough is raised above that of the gas passing through the chamber 17, and consequently the pressure exerted on the lever by the thermostat 32 exceeds that exerted thereon by the thermostat 31, and the lever 34 will therefore be tilted. When this occurs, the adjusting screw 36 carried by the lever 34 engages a finger 37 on a switch 38.

The switch 38 is pivotally mounted at 39 and comprises a container 40 having a pair of contacts 41 at one end thereof and a pair of contacts 42 at the other end thereof. Within the container 40 is a bead of mercury 43, and the construction of the container 40 is such that when the switch is horizontal the mercury bead lies at the central portion thereof as indicated in Figure 2. However, when the switch is tilted by the movement of the lever 34, the bead 43 moves to the left-hand end of the container 40, as viewed in Figure 2, and makes an electrical connection between the contacts 41. The switch will remain tilted and the contact between the terminals 41 will be maintained so long as the lever 34 remains in its tilted position or until the control of the furnace has been effected to reduce the quantity of unburned gas remaining in the flue gas. In certain cases, as for example in the combustion of blast furnace gas, it is considered desirable to have a certain small percentage of unburned gas in the flue gas. The desired quantity may be readily fixed by adjusting the orifices 21 of the chambers 17 and 18 to vary the relative amounts of gas passing therethrough. Furthermore, the sensitivity of the control effected by thermostat 32 may be regulated by adjusting the set screw 36 since the normal distance the set screw is separated from the finger 37 is a measure of the sensitivity of the apparatus.

The thermostat 33, which lies above the chamber 19, is pivotally connected at 44 to a lever 45. This lever is fulcrumed at 46 and it carries the fulcrum 35 of the lever 34. Preferably, the fulcrum 35 is at a horizontal distance from the fulcrum 46 corresponding to half the distance of the pivot 44 from the fulcrum 46. This is for the reason that, when the thermostat 33 tends to tilt the lever 45, the motion is opposed by thermostats 31 and 32. The increased leverage of the thermostat 33 is therefore provided to normally balance this doubled resistance and permit the thermostat 33 to tilt the lever 45 about its fulcrum 46 in case combustion of excess air takes place in chamber 19. This arrangement is, of course, based upon the supposition that all three thermostats are the same and such an arrangement will be found generally desirable.

The switch 38 is carried on the lever 45 so that, if the lever is tilted by the action of the thermostat 33, the switch will be tilted and the mercury bead will move to the right and connect the contact terminals 42. A set screw 47 is provided for adjusting the normal position of the lever 45, and a spring 48 is utilized for holding the set screw against its stationary stop 49. The percentage of excess air which it may be desired to maintain in the flue gas may be fixed by adjusting the size of the orifice 21 for the chamber 19 relative to the size of the orifice 21 for the chamber 17. By adjusting the set screw 47 and the tension of the spring 48 the sensitivity of the control effected by the thermostat 33 may be readily determined. A set screw 50 is provided for levelling the switch 38 in case the arm 45 is initially set to a slightly tilted position by the set screw 47.

It will be seen that if combustion is taking place in both the chamber 18 and the chamber 19, the effect of the thermostat 32 on the control mechanism is neutralized by the thermostat 33, and that the effect of the thermostat 33 is neutralized by the combined action of the thermostats 31 and 32. Obviously, any changes in operating conditions such as changes in room temperature, changes in the temperature of the flue gases, or changes in the amount of current passing through the resistance elements will have no effect on the control mechanism since such changes effect all of the thermostats equally. The main purpose of providing the chamber 17 in which the gas is heated, but in which combustion does not take place, becomes readily apparent as it serves as an effective basis of comparison. It will also be apparent that when combustion takes place in either chamber 18 or in chamber 19, the heating element for that chamber will become hotter by reason of such combustion, and its resistance to the passage of electric current will become correspondingly greater than that of the other heating elements. This tends to render the apparatus still more sensitive, as the thermostats are subjected not only to the increased temperature by reason of combustion, but also to the increased temperature of the heating element in the chamber in which combustion is taking place.

When combustion of unconsumed fuel takes place in the chamber 18, such combustion also takes place in the chamber 19. However, in the arrangement shown, the thermostats 32 and 33 act upon the lever 45 with the same leverage tending to swing the lever in opposite directions about its fulcrum 46. The combined effect of the combustion in chambers 18 and 19 on the lever 45 is therefore zero. Furthermore, the thermostat 32 is aided by the spring 48. However, combustion in chamber 18 causes thermostat 32 to overcome the effect of thermostat 31 on lever 34 so that the latter is tilted to operate the switch 38 as previously described.

The electrical connections are shown in Figure 1. Current is drawn from a line L' through a wire 51 having a branch 52 terminating in one of the contacts 41 and a branch 53 terminating in one of the contacts 42. A wire 54 leads from the second contact 41 to a magnet 55, from which the circuit is completed through a wire 56 leading to a line wide L². Similarly, a wire 57 leads from the second contact 42 to a magnet 58 from which circuit is completed through a wire 59.

The magnets 55 and 58 control the operation of a switch 60 which is normally held open by springs 61. If the magnet 55 is operated, the switch 60 is thrown to a position to operate a motor 62 in a direction tending to open the damper 9 and increase the stack draft, thus increasing the quantity of air in the flue gas. If the magnet 58 is energized, it is effective for throwing the switch 60 in the other direction, thus operating the motor 62 in a direction tending to close the damper 9 and cut down the quantity of excess air in the flue gas. By reason of the springs 61, the motor 62 will operate only so long as either the magnet 55 or 58 is actually energized so that the motor 62 will stop and the damper 9 will maintain its position thus determined.

In order to prevent hunting of the apparatus, it is desirable to give the furnace time to adjust itself to the changed conditions imposed by a setting of the damper 9 before the control apparatus 15 has an opportunity of throwing the damper so far that an over control will result. This may be accomplished in a variety of ways. For example, the damper 9 may be driven by the motor 62 through a low speed gear reduction, thus making the movement on the damper exceedingly slow. However, I preferably provide a time operated circuit breaker 63 in the wire 51 which is effective for closing a switch 64 for a few seconds at spaced time intervals. By such an arrangement, the damper motor 62 can only be operated for a few seconds after which it comes to a rest until the switch 64 is again closed. If the desired adjustment has not yet been effected, the control apparatus 15 will still hold the switch 38 in tilted position, so that the motor 62 will again be operated to move the damper another step. This is repeated until the damper has been moved a sufficient distance to effect the desired regulation.

I thus provide an effective control means for regulating the combustion in a furnace. The regulation is accomplished by burning the unconsumed elements of combustion remaining in the flue gas and utilizing the resulting increased temperature to control the supply of an element of combustion to the furnace. More specifically, the control is effective for varying the fuel-air ratio of the furnace as desired. By relatively regulating the orifices 21, any desired quantity of excess air or unburned fuel may be left in the flue gas, and by adjusting the set screws 36 and 47 and the tension of the spring 48, the sensitivity of the entire apparatus may be readily adjusted. The provision in the various chambers of heating grids having their resistances and surface areas so proportioned as to supply heat in the desired quantities at different temperatures to the various chambers makes it possible to insure combustion of the desired elements in the said chambers, thus effectively operating the thermostats to secure the desired control.

While I have shown a preferred form of my invention which is applicable for the control of a furnace under all conditions, it may be desirable in certain instances to omit one or more of the chambers and control in accordance with the remaining chambers. Similarly, other changes may be made, for while I have shown the preferred form of my invention, it is not limited thereto but may be otherwise embodied within the scope of the following claims.

I claim:

1. The method of controlling furnace combustion, which includes causing combustion of at least one unconsumed element of combustion remaining in undiluted flue gas from such furnace, and utilizing the resulting increased temperature of the flue gas to control the supply of an element of combustion to the furnace, substantially as described.

2. The method of controlling furnace combustion, which includes causing combustion of at least some unconsumed fuel or air remaining in undiluted flue gas from such furnace, and utilizing the resulting increased temperature of the flue gas to vary the fuel-air ratio of the furnace in a direction tending to eliminate the presence of fuel or air in the flue gas, substantially as described.

3. The method of controlling furnace combustion, which includes adding heat to a plurality of quantities of undiluted flue gas in such manner as to cause combustion of at least one unconsumed element of combustion in one of such quantities, and utilizing the excess of heat in such quantity of flue gas resulting from such combustion to control the supply of an element of combustion to the furnace, substantially as described.

4. The method of controlling furnace combustion, which includes subjecting a plurality of quantities of flue gas to heaters delivering heat at different temperatures, at least one of such temperatures being sufficient to cause combustion of an element of combustion remaining in the flue gas, and utilizing the increased temperature in the flue gas to control the supply of an element of combustion to the furnace, substantially as described.

5. The method of controlling furnace combustion, which includes subjecting predetermined quantities of flue gas to heaters normally delivering predetermined quantities of heat but maintained at different temperatures, at least one of such temperatures being sufficient to cause combustion of an element of combustion remaining in the flue gas, and utilizing the increased temperature of the flue gas to control the supply of an element of combustion to the furnace, substantially as described.

6. The method of controlling furnace combustion, which includes exposing a temperature-responsive means to flue gas, causing combustion of at least one unconsumed element of combustion remaining in another portion of flue gas, exposing a second temperature-responsive means to the increased temperature caused by reason of said combustion, and controlling the supply of an element of combustion to the furnace in accordance with the action of said temperature-responsive means, substantially as described.

7. The method of controlling furnace combustion, which includes exposing a temperature-responsive means to flue gas, causing combustion of any unconsumed element of combustion remaining in another portion of flue gas, supplying the flue gas after such combustion to a second temperature-responsive means, and regulating the relative rate of supply of the flue gas portions to set the flue gas composition which is to be maintained, substantially as described.

8. The method of controlling furnace combustion, which includes causing combustion of at least one element of combustion remaining in the flue gas, said flue gas being substantially undiluted, comparing the heating effect of a quantity of flue gas so treated with a quantity not so treated, and regulating the supply of an element of combustion to the furnace in accordance with such comparison, substantially as described.

9. The method of controlling furnace combustion, which includes causing combustion of at least one element of combustion remaining in the flue gas, said flue gas being substantially undiluted, comparing the heating effect of a quantity of flue gas so treated with a standard of comparison, and regulating the supply of an element of combustion to the furnace in accordance with such comparison, substantially as described.

10. The method of controlling furnace combustion, which includes causing combustion of at least one element of combustion remaining in the flue gas, comparing the heating effect of a quantity of flue gas so treated with a quantity not so treated, regulating the supply of an element of combustion to the furnace in accordance with such comparison, and setting the flue gas composition which is to be maintained by relatively varying such quantities, substantially as described.

11. The method of controlling furnace combustion, which includes burning at least one element of combustion remaining in the flue gas, said flue gas being substantially undiluted, continuously comparing the heating effect of flue gas so treated with flue gas not so treated, and intermittently regulating the supply of an element of combustion to the furnace in accordance with such comparison, substantially as described.

12. The method of controlling furnace combustion, which includes burning at least one element of combustion remaining in the flue gas, said flue gas being substantially undiluted, continuously comparing the heating effect of flue gas so treated with a standard of comparison, and intermittently regulating the supply of an element of combustion to the furnace in accordance with such comparison, substantially as described.

13. The method of controlling furnace combustion which includes causing combustion of at least one element of combustion remaining in the flue gas, continuously comparing the heating effect of the flue gas so treated with flue gas not so treated, regulating the supply of an element of combustion to the furnace according to such comparison, and setting the flue gas composition which is to be maintained by relatively varying the quantities of flue gas whose heating effects are to be compared, substantially as described.

14. The method of controlling furnace combustion, which includes exposing a temperature-responsive means to flue gas, causing combustion of at least one unconsumed element of combustion remaining in another portion of flue gas, supplying the flue gas after such combustion to a temperature-responsive means, and controlling the supply of an element of combustion to the furnace in accordance with the relative heating effects of the two quantities of flue gas, the flue gas used for such comparison being withdrawn from the furnace or furnace connections in excess of the quantity required for such comparison, substantially as described.

15. Furnace control apparatus, including a plurality of flue gas passages, means for passing predetermined quantities of flue gas therethrough, means for adding heat to the flue gas passing through the passages in such manner as to cause combustion of at least one unconsumed element of combustion in at least one of such passages, and regulating means actuated in accordance with the comparative temperature effect of the flue gas in the passages for controlling the operation of the furnace, substantially as described.

16. Furnace control apparatus, including a plurality of heaters, means for supplying flue gas thereto, at least one of such heaters being adapted to cause combustion of at least one element of combustion remaining in the flue gas, all of the heaters being adapted to normally deliver predetermined quantities of heat, and means responsive to the difference in heating effect of the flue gas leaving the heaters for controlling the operation of the furnace, substantially as described.

17. Furnace control apparatus, including means for causing combustion of at least one unconsumed element of combustion remaining in the flue gas of the furnace, and means actuated in accordance with the comparative heating effect of a quantity of gas so treated with a quantity of gas not so treated, such means being effective for controlling a supply of an element of combustion to the furnace, substantially as described.

18. Furnace control apparatus, including means for causing combustion of at least one unconsumed element of combustion remaining in the flue gas of the furnace, means actuated in accordance with the comparative effect of a quantity of flue gas so treated with a quantity of flue gas not so treated, such means being effective for controlling the supply of an element of combustion to the furnace, and means for effectively adjusting such quantities, substantially as described.

19. Furnace control apparatus, including a plurality of temperature-responsive means, means for supplying flue gas to one of such means, means for causing combustion of at least one unconsumed element of combustion remaining in another portion of the flue gas and for supplying it to another of such temperature-responsive means, and control means actuated in accordance with the comparative effect of the flue gas on the different temperature-responsive means, substantially as described.

20. Furnace control apparatus, including a plurality of passages for flue gas from the furnace, heating means for such passages adapted to normally supply predetermined quantities of heat to the flue gas passing therethrough, one of such heating means being adapted to cause combustion of at least some unconsumed fuel remaining in the flue gas passing through such passage, and control means actuated in accordance with the comparative heating effect of the flue gas passing through the passages to control the supply of an element of combustion to the furnace, substantially as described.

21. Furnace control apparatus, including a plurality of passages for flue gas from such furnace, heating means adapted to supply predetermined quantities of heat to the flue gas passing through such passages, means for adding fuel to the flue gas passing through one of such passages, the heating means for such passage being adapted to cause combustion of such fuel with any air remaining in the flue gas, and means responsive to the relative heating effect of the flue gas in such passages for controlling the supply of an element of combustion to the furnace, substantially described.

22. Furnace control apparatus, including a plurality of passages for flue gas from such furnace, means for heating the flue gas passing through such passages, one of such heating means being adapted to cause combustion of at least some unconsumed fuel in the flue gas passing through the corresponding passage, means for adding fuel to the flue gas passing through another of such passages, the heating means for such passage being adapted to cause combustion of such fuel with any air remaining in the flue gas, and control means responsive to the relative heating effect of the flue gas in the various passages for controlling the supply of an element of combustion to the furnace, substantially as described.

23. Furnace control apparatus, including a plurality of passages for flue gas from the furnace, heating means for each passage, the heating means being adapted to normally deliver predetermined quantities of heat to the flue gas in the several passages at different temperatures, and control apparatus responsive to the relative temperature of the flue gases in the several passages, substantially as described.

24. Furnace control apparatus, including a plurality of passages for flue gas from the furnace, electric heating means for each passage, the heating means delivering predetermined quantities of heat at different temperatures, and control apparatus responsive to the relative temperature of the flue gases in the several passages, substantially as described.

In testimony whereof I have hereunto set my hand.

JOHN H. GILLOOLY.